US006306297B1

(12) United States Patent
Ichitsuka et al.

(10) Patent No.: US 6,306,297 B1
(45) Date of Patent: Oct. 23, 2001

(54) PACKING MATERIAL FOR LIQUID CHROMATOGRAPHY AND PROCESS FOR PRODUCING THE SAME

(75) Inventors: Takeshi Ichitsuka; Tetsuro Ogawa; Masaya Sumita; Akihiko Yokoo; Katsumi Kawamura, all of Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/371,205

(22) Filed: Jan. 11, 1995

Related U.S. Application Data

(62) Division of application No. 08/029,940, filed on Mar. 10, 1993, now Pat. No. 5,441,635, which is a continuation of application No. 07/908,740, filed on Jul. 6, 1992, now abandoned, which is a continuation of application No. 07/654,982, filed on Feb. 14, 1991, now abandoned, which is a continuation of application No. 07/461,854, filed on Jan. 8, 1990, now Pat. No. 5,039,408, and a continuation-in-part of application No. 07/397,360, filed on Aug. 23, 1989, now abandoned, and a continuation-in-part of application No. 07/216,975, filed on Jul. 8, 1968, now abandoned, which is a continuation-in-part of application No. 07/069,734, filed on Jul. 6, 1987, now abandoned, and a continuation-in-part of application No. 07/069,742, filed on Jul. 6, 1987, now abandoned, which is a continuation of application No. 07/069,740, filed on Jul. 6, 1987, now abandoned.

(30) Foreign Application Priority Data

| Jul. 5, 1986 | (JP) | 61-158410 |
| Jul. 5, 1986 | (JP) | 61-158411 |
| Jul. 5, 1986 | (JP) | 61-158412 |
| Jul. 8, 1987 | (JP) | 62-170715 |

(51) Int. Cl.[7] ................................ B01D 15/08
(52) U.S. Cl. .................... 210/198.2; 210/502.1; 210/656; 423/308; 423/311; 502/400
(58) Field of Search .................. 502/208, 10, 400; 423/308, 311; 210/635, 656, 198.2, 502.1

(56) References Cited

U.S. PATENT DOCUMENTS

| 3,505,785 | * | 4/1970 | Kirkland | 210/198.2 |
| 3,943,072 | | 3/1976 | Thomson et al. | 252/455 R |
| 3,989,649 | | 11/1976 | Kaiho | 260/21 R |
| 4,045,353 | | 8/1977 | Kosaka et al. | 210/502 |
| 4,073,999 | | 2/1978 | Bryan et al. | 428/311 |
| 4,149,893 | | 4/1979 | Aoki et al. | 106/35 |
| 4,219,590 | | 8/1980 | Shibazaki et al. | 427/215 |
| 4,252,831 | | 2/1981 | Glecker et al. | 426/74 |
| 4,293,426 | | 10/1981 | Gago | 210/759 |
| 4,375,496 | | 3/1983 | Nowakowski et al. | 428/403 |
| 4,470,839 | | 9/1984 | Gago | 71/34 |
| 4,477,492 | | 10/1984 | Bergna et al. | 427/215 |
| 4,497,075 | | 2/1985 | Niwa et al. | 106/306 |
| 4,503,157 | | 3/1985 | Hatahira | 501/1 |
| 4,544,601 | | 10/1985 | Yamaguchi et al. | 428/330 |
| 4,629,464 | | 12/1986 | Takata et al. | 623/16 |
| 4,693,986 | | 9/1987 | Vit et al. | 501/1 |
| 4,711,769 | | 12/1987 | Inoue et al. | 423/308 |
| 4,743,377 | | 5/1988 | Ohtsu et al. | 210/635 |
| 4,767,583 | | 8/1988 | van der Meer et al. | 264/63 |

FOREIGN PATENT DOCUMENTS

| 2601930 | 7/1977 | (DE) | 210/198.2 |
| 205622 | 12/1986 | (EP) | 210/198.2 |
| 217614 | 4/1987 | (EP) | 210/198.2 |
| 274608 | 7/1988 | (EP) | 210/198.2 |
| 1586364 | 3/1981 | (GB) | 210/198.2 |
| 2142919 | 1/1985 | (GB) | 210/198.2 |
| 0155290 | 12/1975 | (JP) | 210/198.2 |
| 0143762 | 7/1985 | (JP) | 210/198.2 |
| 60198458 | 10/1985 | (JP) | 210/198.2 |

OTHER PUBLICATIONS

Kawasaki Eur. J. Biochem. 157, pp. 291–295, Jun. 2, 1986.*

The cover page and page 73 of WO 91/00762 of Jan. 24, 1991.*

Moreno, Physicalchemical Aspects of Fluoride—Apatite Systems Relevant to the Study of Dental Cavies, in Caries Res., vol. 11, (Suppl. 1), pp. 142–171 (1977).

Amjad, Fluoride Influence on Mineralization, Caries Res., vol. 13, pp 250–258 (1979).

Kadoya "A New Spherical Hydroxy Apatite" Journal of Liquid Chromatography, vol. 9 (16) pp. 3543–3557 (1986).

Chander, An XPS Study of the Fluoide Uptake by Hydroxyapatite, Colloid & Surfaces vol. 13, 137–144 (1985).

Napper, The Dissolution Kinetics of Hydroxyapatite in the Presence of Kink Poisons, J. Dent Res., vol. 45 pp. 1775–1783 (1966).

Chemical Abstracts, vol. 107, No. 101608, entitled "Calcium Phosphate" Sintered Body with Apatite Coating (Sep. 1987).

Chemical Abstracts, vol. 77, No. 126 605t entitled Affinity Citric Acid for Mineral Phase in Calcified Tissues (1972).

"Isolation of Oligosaccharides", Kazuhisa Ono et al., Carbohydrate Research, 90(1981), 158–164.

"Isolation of Maltopentaose", W. Terry Jenkins, Analytical Biochemistry 92, 351–355 (1979).

"Protein Chromatography", A. Tiselius et al, Archives of Biochemistry and Biophstics 65, 132–155 (1956).

"Preparation, Microstructure", G. De With et al, Journal of Materials Science 16 (1981) 1952–1598.

Opposition to European Patent No. 0 252 472 filed by Merck on Jun. 28, 1991, and English translation.

*Bio–Industry*, vol. 2, No. 9, pp. 760–763, issued Sep. 1, 1985, and English translation of Table 1 and Photo 2 and Section 2, from p. 72, column 2 to p. 73, column 3.

Derwent Abstract of GB 1421531.

*Rompps Chemie–Lexikon*, Dr. Otto–Albrecht Neumuller, pp. 3328, section entitled "Poren" and English translation.

Rootare & Spencer, "A Computer Program for Pore Volume and Pore Area Distribution . . . ", *Powder Technology*, vol. 6, pp. 17–23, (1972).

Substantiation filed by Merck on May 13, 1992, and English translation.

A. Berthod, "Silica: backbone material of liquid chromatographic column packings".

*CHROM*, 23, Abstract, pp. 16 and 17, Nov. 18, 1991.

\* cited by examiner

*Primary Examiner*—Ernest G. Therkorn
(74) *Attorney, Agent, or Firm*—Sughrue, Mion, Zinn, Macpeak & Seas, PLLC

(57) ABSTRACT

Column packing materials useful in applications such as liquid chromatography, as well as a process for producing such a packing material are described. A first aspect of the invention concerns a column packing material composed of a spherical substrate having a coating of a calcium phosphate based compound on the surface thereof.

A second aspect of the invention concerns a packing material comprising porous calcium phosphate based granules having open pores with an average pore size of from 0.01 to 20 $\mu$m, said granules being composed of crystalline particles with an average size of from 0.1 to 10 $\mu$m.

A third aspect of the invention concerns a spherical packing material for liquid chromatography comprising spherical particles of at least one material selected from the group consisting of $Ca_{10}(PO_4)_6(OH)_2$, $Ca_3(PO_4)_2$, $Ca_2P_2O_7$, $Ca(PO_3)_2$, $Ca_{10}(PO_4)_6F_2$ and $Ca_{10}(PO_4)_6Cl_2$, said packing material having a dense structure with a porosity of no more than 5%.

A fourth aspect of the invention concerns a packing for liquid chromatography comprising particles having at least on the surface thereof a fluoroapatite represented by formula (I):

$$Ca_{10}(PO_4)_6(OH)_{2-2x}F_{2x} \qquad (I)$$

wherein x is a number of from about 0.1 to 1.

1 Claim, 9 Drawing Sheets

PACKING MATERIAL FOR LIQUID CHROMATOGRAPHY AND PROCESS FOR PRODUCING THE SAME

This is a divisional of application Ser. No. 08/029,940, filed Mar. 10, 1993, now U.S. Pat. No. 5,441,635, which is a continuation of application Ser. No. 07/908,740, filed Jul. 6, 1992 (now abandoned), which is a continuation of U.S. application Ser. No. 07/654,982, filed Feb. 14, 1991 (now abandoned), which is a continuation of U.S. application Ser. No. 07/461,854, filed Jan. 8, 1990 (now U.S. Pat. No. 5,039,408), which is a Continuation-in-Part of U.S. application Ser. No. 07/069,734, filed Jul. 6, 1987 (now abandoned), and a Continuation-in-Part of U.S. application Ser. No. 07/069,742, filed Jul. 6, 1987 (now abandoned), and a Continuation-in-part of U.S. application Ser. No. 07/216,575, filed Jul. 8, 1988 (now abandoned), and a Continuation-in-Part of U.S. application Ser. No. 07/397,360, filed Aug. 23, 1989 (now abandoned), which is a continuation of U.S. application Ser. No. 07/069,740, filed Jul. 6, 1987 (now abandoned).

FIELD OF THE INVENTION

The present invention relates to a column packing material useful in applications such as blood treatment with columns and liquid chromatography used in separating and purifying proteins, enzymes, nucleic acids, monosaccharides, oligosaccharides, etc., as well as a process for producing such a packing material.

BACKGROUND OF THE INVENTION

Column packing materials for the applications such as liquid chromatography have conventionally been prepared from silica gel, chemically modified silica gel, polymers, carbon, etc. Porous packing materials are also known and have been prepared from porous silica, chemically modified porous silica, porous polymers, etc.

Calcium phosphate based compounds, in particular synthetic hydroxyapatite represented by $(Ca_{10}(PO_4)_6(OH)_2)$, have the same composition as the inorganic main components of teeth and bones, and, taking advantage of tis superior biocompatibility, artificial dental roots or bone prosthetic materials made of synthetic hydroxyapatite have been developed. The biological affinity of hydroxyapatite has been ascribed to the close relationship to biological high polymeric substances such as proteins and sugars.

Attempts have been made for many years to produce packing materials for liquid chromatography from such hydroxyapatite, which is closely related to the living body. In recent years, packing materials that are characterized either by the process of their production or by their shape have been proposed, as described, for example, in Unexamined Published Japanese Patent Application No. 143762/1985. Packing materials based on hydroxyapatite have both cation and anion exchanging properties, and work in a normal-phase mode in analysis of substances such as glycosides. Therefore, hydroxyapatite based packing materials are versatile in that a single column packed with them can be used in a broad range of applications.

One problem with the prior art hydroxyapatite based packing materials, which are not fired, is that they do not have sufficiently high pressure resistance to allow for rapid passage of a mobile phase, with subsequent difficulty in separating large volumes of a sample within a short period of time. As a further problem, the conventional hydroxyapatite based packing materials are highly soluble, so if a mobile phase is caused to flow over an extended period, the surface of the packing material dissolves to cause deterioration of its separating performance (i.e., resolution). Furthermore, the fine particles of hydroxyapatite resulting from the dissolved surface of the packing material will tend to block the passage of the mobile phase and clog the column filter, thereby rendering it no longer usable.

Another major problem with such packing materials prepared from calcium phosphate based compounds is that it is extremely difficult to form granules having a uniform shape and size. When such packing materials are used in liquid chromatography, the number of theoretical plates attainable is small, tailing is prone to occur in chromatograms, and difficulty is encountered in adjustment of the pressure for pumping a mobile phase and controlling its flow rate.

Further, the conventional calcium phosphate based compounds have been chiefly intended for separation of materials such as proteins and enzymes, and in order to attain higher resolution separations, most of the compounds have been used in a porous state having a large surface area. Porous packing materials are also used in gel permeation chromatography (see, for example, Unexamined Published Japanese Patent Application No. 155290/1975). In gel permeation chromatography, however, materials of similar chemical composition are separated in the order of their molecular weight, with the higher molecular weight components eluting first.

The present inventors have found that if a porous packing material made of a calcium phosphate based compound is used in separation of saccharides, the separating performance of the packing material is adversely affected by its propensity to cause separation of components in the decreasing order of their molecular weight, as in the case of gel permeation chromatography.

A further problem with calcium phosphate compounds is that they generally have high solubility in acidic solutions, which is a serious problem in various applications and conditions under which packing materials are intended or desired to be used. That is, hydroxyapatite packing shows both cation exchanging ability and anion exchanging ability to proteins, etc., while exhibiting high ability in separation of glycosides in the normal phase mode using acetonitrile and water as an eluent. Owing to such characteristics, a single column packed with hydroxyapatite can be applied to separation of a variety of substances. Since the desired substance can be separated under mild elution conditions, the sample under chromatography is protected from deactivation. Furthermore, the column has a high recovery. Therefore, with developments in the biological industry, hydroxyapatite has been regarded as one of the most promising packings for chromatography. That is, hydroxyapatite is the only one of the apatite compounds which has hitherto been used not only as an implant material, but also as a packing for liquid chromatography, as described in *Journal of Liquid Chromatography*, Vol. 9(16), pp. 3543–3557 (1986).

However, the hydroxyapatite packing is poor in resistance to dissolution in acidic solutions, sometimes failing to fulfill its function. That is, when an acidic mobile phase is passed through the column packed with hydroxyapatite for a long period of time, crystals of hydroxyapatite are dissolved out and fine crystals released from the surface of packing particles and obstruct the passage of the mobile phase, eventually becoming useless. Therefore, the conventional hydroxyapatite packing is not suitable for separation operation in an acidic region. Particularly at a pH of 5.5 or less such packing cannot be used continuously and the range of substances to which it is applicable is naturally limited.

With respect to hydroxyapatite containing fluorine, fluoride uptake by hydroxyapatite has been reported, as described in *Colloids and Surfaces,* Vol. 13, pp. 137–144 (1985). However, its application to chromatography has not yet been reported or established.

SUMMARY OF THE INVENTION

An object, therefore, of the present invention is to provide a packing material that comprises a calcium phosphate based compound and which is in the form of spherical granules of a uniform size.

A further object of the present invention is to provide a packing material for liquid chromatography that has high resolution and exhibits superior resistance to pressure and dissolution.

A further object of the present invention is to provide a packing material that is made from a calcium phosphate based compound and which is suitable for use in separation of saccharides.

Another object of the present invention is to provide a packing material for liquid chromatography which exhibits high performance for separating a wide range of substances and excellent resistance to dissolution and maintains its functions stably for a long period of time.

Yet another object of the present invention is to provide a process for producing such packing materials.

Other objects and effects of this invention will be apparent from the following description.

In accordance with a first aspect of the present invention, a packing material is provided comprising particles composed of a spherical substrate having a coating of a calcium phosphate based compound on the surface thereof.

A second aspect of the present invention concerns a packing material for liquid chromatography that is composed of porous calcium phosphate based granules having open pores with an average pore size of from 0.01 to 20 $\mu$m, said granules being composed of crystalline particles with an average size (average diameter) of from 0.1 to 10 $\mu$m.

The second aspect of the present invention involves a process for producing a packing material for liquid chromatography that comprises mixing calcium phosphate based particles with pyrolyzable particles having an average size of from 0.02 to 30 $\mu$m, granulating the mixing, and firing the granulation at 900 to 1,400° C. to cause complete combustion of the pyrolyzable particles.

The second aspect of the present invention further involves a process for producing a packing material for liquid chromatography that comprises providing a slurry containing calcium phosphate based particles, adding a foaming agent to the slurry to form bubbles having an average size of from 0.02 to 30 $\mu$m, drying the foam to make a porous material, grinding the porous material into granules, and firing the granules at from 900 to 1,400° C.

In the third aspect of the present invention, the present inventors made further studies on the separation of components other than proteins and enzymes with packing materials made of calcium phosphate based compounds such as hydroxyapatite. As a result, it has now been found that certain dense calcium phosphate based compounds are effective in the separation of saccharides, with the separation pattern being such that the lower molecular weight components elute first.

The spherical packing material for liquid chromatography of the third aspect of the present invention comprises spherical particles of at least one material selected from the group consisting of $Ca_{10}(PO_4)_6(OH)_2$, $Ca_3(PO_4)_2$, $Ca_2P_2O_7$, $Ca(PO_3)_2$, $Ca_{10}(PO_4)_6F_2$ and $Ca_{10}(PO_4)_6Cl_2$, and said packing material has a dense structure with a porosity of no more than 5%.

In the fourth aspect of the present invention, in order to provide a packing for liquid chromatography excellent in dissolution resistance including acid resistance and yet maintaining the high separation performance of hydroxyapatite, the present inventors have investigated the use of fluoroapatite (one of the compounds having the apatite structure) as the packing and accomplished the present invention.

The fourth aspect of the present invention thus relates to a packing for liquid chromatography comprising particles having at least on the surface thereof a fluoroapatite represented by formula (I):

$$Ca_{10}(PO_4)_6(OH)_{2-2x}F_{2x} \qquad (I)$$

wherein x represents a number of from about 0.1 to 1, preferably from about 0.4 to 1, and more preferably about 1.

BRIEF DESCRIPTION OF THE DRAWINGS

FIG. 9(*b*) is a chromatogram obtained by using a hydroxyapatite packing.

DETAILED DESCRIPTION OF THE INVENTION

Figure 1:
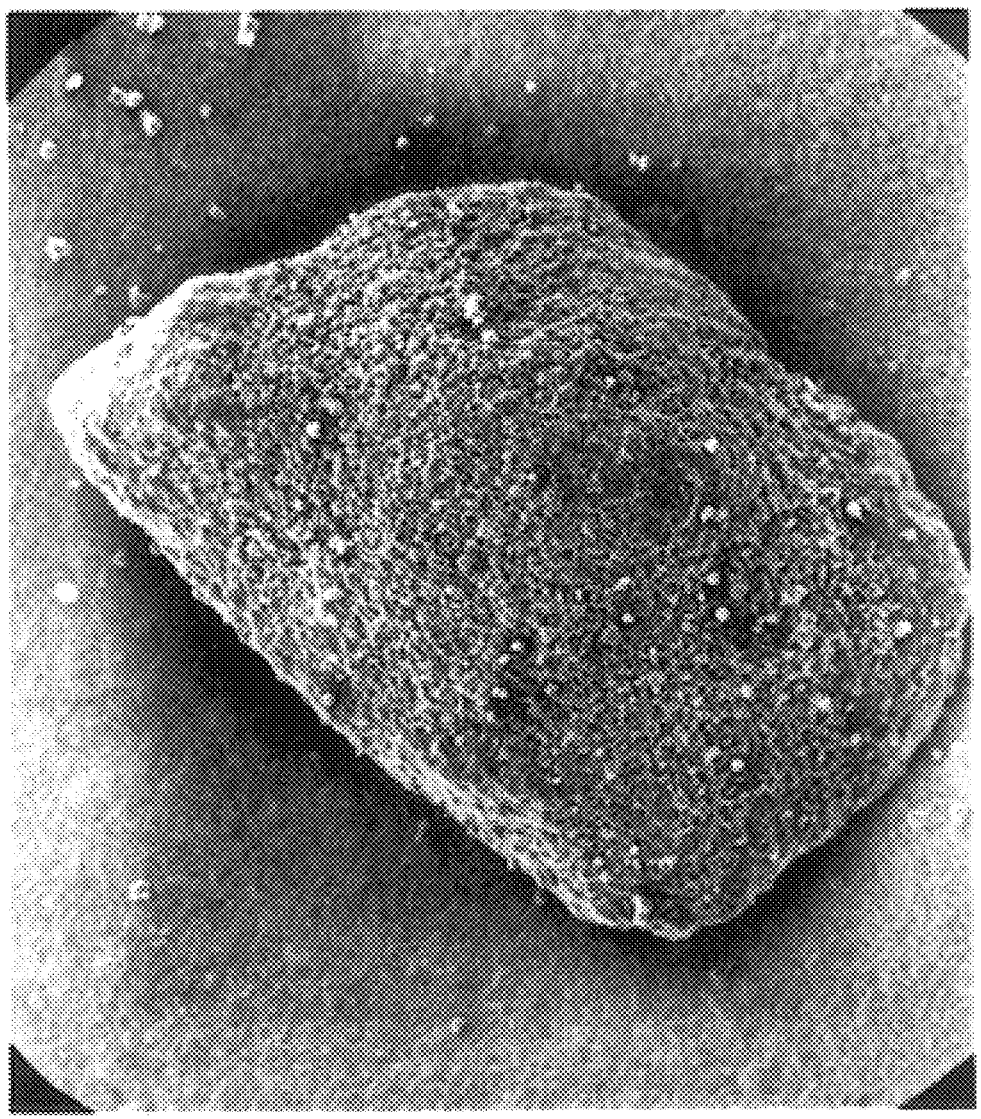
FIG. 1 is an electron micrograph (×100) showing the structure of a granule in the packing material prepared in Example 5.

The first aspect of the present invention will now be discussed in detail. Since the particles of packing material in the first aspect of the present invention are formed by coating the surface of a spherical substrate with a calcium phosphate based compound, they are very close to true spheres in shape and have a uniform size if the spherical substrate used is selected from among various known beads. A packing material comprising such particles can advantageously be used in liquid chromatography, producing desirable results such as an increase in the number of theoretical plates attainable, reduced occurrence of tailing, and easy adjustment of the pressure for pumping a mobile phase and its flow rate.

Examples of the calcium phosphate based compound that can be used in making the column packing material of the first aspect of the present invention include $Ca_{10}(PO_4)_6(OH)_2$, $Ca_3(PO_4)_2$, $Ca_2P_2O_7$, $Ca(PO_3)_2$, $Ca_{10}(PO_4)_6F_2$ and $Ca_{10}(PO_4)_6Cl_2$. These calcium phosphate based compounds can be synthesized by a variety of known methods, such as the wet method in which a water-soluble phosphate salt is reacted with a water-soluble calcium salt in an aqueous solution, and the dry method in which a phosphoric compound is reacted with a calcium compound under elevated temperatures. Beads of materials such as polyesters, polystyrenes, polyacrylics, carbon, silica, alumina, and phosphate glass can be used a the spherical substrate in the present invention. Beads of such materials are commonly available in the commercial market, and known examples include: polystyrene beads (e.g., "Fine Pearl" of Sumitomo Chemical Co., Ltd.), polyacrylic beads (e.g., "Fine Pearl" of Sumitomo Chemical Co., Ltd.), carbon beads (e.g., product of Moritex), silica beads (e.g., "Nucleosil" of Nagel) and alumina beads (e.g., product of Moritex with 99.5% $Al_2O_3$). The size of these beads may be appropriately selected in accordance with the size of the granules in the desired packing material.

A calcium phosphate based compound can be coated on the surface of the spherical substrate by any suitable method such as sputtering, agglomeration by spray drying, or agglomeration by rolling and tumbling.

The particles in the packing material of the present invention are preferably adjusted to have a size (diameter) in the range of from 1 to 100 $\mu$m. If their size is less than 1 $\mu$m, increased resistance to flow will occur when the mobile phase is pumped into the packed column. If the size of the particles exceeds 100 $\mu$m, they have such a decreased surface area that the resolution (separating performance) of the packing material is prone to decrease.

The thickness of the coating of a calcium phosphate compound is preferably within the range of from about 0.5 to about 50 $\mu$m. If the thickness of the coating is less than 0.5 $\mu$m, the coating will not have the desired strength. If the thickness of the coating exceeds 50 $\mu$m, the spherical nature of the particles becomes difficult to maintain.

Turning now to the second aspect of the invention, it is known that packing materials for liquid chromatography are generally in the form of porous granules so that they have large enough specific surface areas to achieve contact with as high volumes of samples as possible. Hydroxyapatite based packing materials can also be provided with a greater ability to separate proteins or enzymes if they are formed as porous granules. A convenient method for preparing porous hydroxyapatite granules is spray drying, in which a hydroxyapatite slurry synthesized by a conventional wet method is sprayed into an air stream at from 80 to 250° C. to form porous granules having a size (diameter) of from 2 to 150 $\mu$m, which are then fired at from 500 to 700° C., to provide a packing material having improved resolution and pressure resistance. A column packed with this packing material can be satisfactorily used in liquid chromatography under commonly employed operating conditions. However, in liquid chromatography intended for industrial separation and purification, more pressure resistance and durability are sometimes required in order to achieve processing of the desired sample in larger volumes.

In order that hydroxyapatite granules will have not only a greater pressure resistance or strength, but also enhanced resistance to dissolution, they may be fired at elevated temperatures to permit sufficient growth of crystalline particles. However, if the firing temperature is simply elevated, voids between crystalline particles will be lost and the hydroxyapatite granules change from the porous to dense state to become deteriorated in their separating performance.

Therefore, an important object of the present invention is to improve the resistance to pressure and dissolution of porous hydroxyapatite granules by firing them at elevated temperatures without sacrificing their porosity. This aspect of the present invention is hereinafter described more specifically.

In addition to the hydroxyapatite ($Ca_{10}(PO_4)_6(OH)_2$) already mentioned, fluoroapatite ($Ca_{10}(PO_4)_6F_2$), chloroapatite ($Ca_{10}(PO_4)_6Cl_2$), tricalcium phosphate ($Ca_3(PO_4)_2$) and various other kinds of known calcium phosphate based compounds may be employed in the present invention. Such calcium phosphate based compounds can be synthesized by known wet and dry methods.

According to one method for producing the packing material of the second aspect of the present invention, calcium phosphate based particles are mixed with pyrolyzable particles having an average size of from 0.02 to 30 $\mu$m, and the mixture is granulated and fired at from 900 to 1,400° C. to cause complete combustion of the pyrolyzable particles. In a preferred case, pyrolyzable particles may be added to a slurry of a calcium phosphate based compound that has been synthesized by a wet method, the resulting mixture being then spray-dried. It is necessary that the pyrolyzable particles should not undergo thermal decomposition or deterioration during spray drying and heat-resistant resins such as fluorine resins are preferably used as the materials of such pyrolyzable particles. Other heat-resistant resins may of course be used. The pyrolyzable particles are preferably added in amounts ranging from 30 to 70 parts by weight per 100 parts by weight of the solid content of the calcium phosphate based compound. If less than 30 parts of weight of the pyrolyzable particles are used, the intended porosity is not attained. If more than 70 parts by weight of the pyrolyzable particles are used, the porosity of the resulting granules is too high to ensure satisfactory strength. For increasing the strength of binding between the granules formed from the sprayed slurry, a binder such as polyvinyl alcohol may be added to the slurry. The resulting granules are then fired at from 900 to 1,400° C. to cause complete combustion of the pyrolyzable particles and thereby form porous granules. By adjusting the average size of the pyrolyzable particles to be within the range of from 0.02 to 30 $\mu$m, the fired granules can be provided with pores having an average size of from 0.01 to 20 $\mu$m.

According to another method for producing the packing material of the second aspect of the present invention, a slurry containing calcium phosphate based particles is first provided, and a foaming agent is added to the slurry to form bubbles having an average size of from 0.02 to 30 $\mu$m, the foam being then dried to form a porous material which is ground into granules and fired at from 900 to 1,400° C. In this method, the foam comprising the bubbles with an average size of 0.02 to 30 $\mu$m that have been formed by addition of the foaming agent is fired to produce open pores having an average pore size of 0.01 to 29 $\mu$m. A suitable foaming agent is aqueous hydrogen peroxide or ovalbumin.

The above-described methods for producing the packing material of the present invention are characterized in that even if the firing temperature is elevated to be within the range of from 900 to 1,400° C., the resulting granules have open pores with an average pore size of from 0.01 to 20 $\mu$m. By employing such high firing temperatures, the crystalline particles of which the calcium phosphate based granules are composed can be provided with an average size in the range of from about 0.1 to 10 µm.

Therefore, the packing material of the second aspect of the present invention comprises porous calcium phosphate based granules having open pores with an average pore size of from 0.01 to 20 µm and the crystalline particles of which these granules are composed have an average size of from 0.01 to 10 µm. The packing material having these dimensional features can be used in liquid chromatography for achieving high resolution while exhibiting strong resistance to pressure and dissolution. Granules having open pores with an average pore size of less than 0.01 µm are difficult to produce. On the other hand, if the average pore size of open pores exceeds 20 µm, not only the specific surface area, but also the strength of the granules will be decreased. If the crystalline particles of which the granules are composed have an average size of less than 0.1 µm, satisfactory resistance to dissolution is not attainable, and if their average size exceeds 10 µm, it becomes difficult to make porous granules. The particles in the packing material taken as a whole preferably have an average size of from about 1 to about 2,000 µm.

The third aspect of the present invention will now be explained.

Since the packing material of the third aspect of the present invention is comprised of dense spherical particles with a porosity of no more than 5%, it has a smaller propensity to separate components according to the elution profile of gel permeation chromatography, and hence is suitable for use in separating saccharides in the increasing order of their molecular weight.

The packing material of the present invention is made of at least one material selected from the group consisting of $Ca_{10}(PO_4)_6(OH)_2$, $Ca_3(PO_4)_2$, $Ca_2P_2O_7$, $Ca(PO_3)_2$, $Ca_{10}(PO_4)_6F_2$, and $Ca_{10}(PO_4)_6Cl_2$. These calcium phosphate based compounds can be synthesized by a variety of known methods, such as the wet method in which a water-soluble phosphate salt is reacted with a water-soluble calcium salt in an aqueous solution and the dry method in which a phosphoric compound is reacted with a calcium compound under elevated temperatures.

The calcium phosphate based compounds listed above are granulated to spherical particles by various techniques such as spray drying and the rolling/tumbling combination. In the method of granulation by spray drying, a calcium phosphate based compound is dispersed in water and the resulting slurry is spray-dried at a temperature of from about 100 to 250° C. to make spherical granules. In the method of granulation by rolling and tumbling, the particles of a calcium phosphate based compound are fed from above onto the central part of a tilted rotary disk and are agglomerated under the rotating action of the disk.

The granules are then fired at a temperature of from 900 to 1,400° C. to make a packing material that comprises spherical particles with a porosity of no more than 5%. If the firing temperature is less than 900° C., a packing material with a porosity exceeding 5% will often result, and the propensity of such packing material to cause separation of components in the decreasing order of their molecular weight, as in gel permeation chromatography, makes it unsuitable for use in the separation of saccharides. If the firing temperature exceeds 1,400° C., the calcium phosphate based compound will undergo a decomposition reaction, and the resulting packing material will have a low resolution.

The particles in the packing material of the third aspect of the present invention need not be completely and perfectly spherical in shape, provided that they are generally spherical in shape, and shapes like eggs or rugby balls are also included within the term "spherical" as used in association with the description of the third aspect of the present invention.

The average size (average diameter) of the particles in the third aspect of the present invention is not limited to any particular value, but is preferably in the range of from about 1 to about 100 µm. If the average size is less than 1 µm, the packing material will have an increased resistance to the passage of a mobile phase through a column. If, on the other hand, the average size exceeds 100 µm, the packing material will have a decreased resolution.

The packing material of the third aspect of the present invention proves particularly effective in the separation of monosaccharides such as glucose or oligosaccharides such as sucrose, lactose, and raffinose, producing a separation pattern in which the lower molecular weight components elute first.

The fourth aspect of the present invention, directed to a packing for liquid chromatography comprising particles having at least on the surface thereof a fluoroapatite represented by formula (I):

$$Ca_{10}(PO_4)_6(OH)_{2-2x}F_{2x} \qquad (I)$$

wherein x is a number of from about 0.1 to 1, will now be explained.

Fluoroapatite which constitutes at least the surface of the packing particles of the present invention includes not only pure fluoroapatite wherein the hydroxyl groups are completely substituted by a fluorine atom (fluorination degree x is 1), but also partially fluorinated hydroxyapatite wherein only a part of the hydroxyl groups is substituted with a fluorine atom to a fluorination degree of at least about 0.1. If the fluorination degree is less than about 0.1, sufficient improvement on acid resistance cannot be reached.

The inside structure of the individual packing particles according to the present invention is not particularly restricted as long as the surface thereof comprises fluoroapatite represented by formula (I). Examples of the embodiment of the invention include (1) a packing comprising fluoroapatite of formula (I) throughout the individual particles, (2) a packing comprising hydroxyapatite particles of which surface is fluorinated to have formula (I), and (3) a packing comprising inert carrier particles coated with fluoroapatite of formula (I).

In the above embodiment (1), the whole of the individual particles is formed of the fluoroapatite of formula (I) and preferably has a specific surface area of from about 0.01 to 20 m²/g. The porosity can be controlled by changing the calcinating temperature or the density of the particle forming material.

In the above embodiments (2) and (3), the thickness of the fluoroapatite surface layer is preferably about 1 µm or more. The specific surface area of the packing is preferably from about 0.01 to 20 m²/g.

The embodiment (1) can be prepared by the method described, e.g., in *Colloids and Surfaces*, Vol. 13, pp. 137–144 (1985). The embodiment (2) can be prepared by reacting a hydroxyapatite packing with a solution containing fluoride ions and then calcinating the same. The embodiment (3) can be prepared by coating fluoroapatite on a carrier, e.g., by sputtering, ion-plating and thermal-spraying.

The packing comprising fluoroapatite throughout the particle according to the first embodiment can be obtained by known processes for producing fluoroapatite such as the method as described in Napper, D. H., Synthe, B. H.: "The Dissolution Kinetics of Hydroxyapatite in the Presence of Kink Poisons", *J. Dent. Res.*, Vol. 45, pp. 1775–1783 (1966). Whether no $CaF_2$ has been formed can be confirmed by calcining the resulting fluoroapatite at an appropriate temperature and subjecting it to X-ray diffractometry. Formation of fluoroapatite can be confirmed by the shift of the (300) peak to a higher angle side by the method described, e.g., in Moreno, E. C., Kresak, M. Zahradnik, R. T.: "Physicochemical Aspects of Fluoride-Apatite Systems Relevant to the Study of Dental Caries", *Caries Res.*, Vol. 11 (Suppl. 1), pp. 142–171 (1977).

The packing comprising hydroxyapatite particles of which surface is fluorinated according to the second embodiment can be prepared, for example, by treating the surface of hydroxyapatite particles with hydrogen fluoride under a controlled pH condition.

The packing comprising inert carrier particles (e.g., alumina) coated with fluoroapatite according to the third embodiment can be prepared, for example, by sputtering.

The packing particles for liquid chromatography of the fourth aspect of the present invention are not particularly limited in size, shape, porosity, etc. However, performances such as separating ability can be assured by following a general particle design for packings for liquid chromatography. For example, the packing preferably has an average particle diameter of from about 2 to 100 $\mu$m, more particularly from about 10 to 100 $\mu$m for industrial use and from about 2 to 10 $\mu$m for use in analyses. If the average particle size is less than about 2 $\mu$m, the pressure loss on passing a liquid sample through a column packed with the packing becomes too large. If it exceeds about 100 $\mu$m, the surface area of the packing per unit volume is too small to assure separating ability. The packing preferably has a shape near to a spherical form in order to obtain stable separation characteristics while preventing cracks or cutouts although those having a macadamized form may be used. The porosity is preferably high in view of the load of the samples, but non-porous packing may be used for the analytical use. The specific surface area is preferably from about 0.01 to 20 $m^2/g$ although depending on the form of the packing particles.

The packing of the present invention can be used for a method for liquid chromatography by (a) packing a column with the packing of the present invention, (b) contacting the packing with a sample comprising at least one solute, and (c) contacting the packing with a liquid mobile phase to separate the solute by elution.

Upon carrying out the method for liquid chromatography using the packing material in accordance with the fourth aspect of the present invention, the preferred eluents are as follows: In an ion exchanging mode, (1) a sodium phosphate buffer (pH 5 to 9), (2) a potassium phosphate buffer, (3) a mixture of a sodium chloride solution and various buffers (e.g., tris buffer, pipes buffer, etc.), and (4) a mixture of a potassium chloride solution and various buffers (e.g., tris buffer, pipes buffer, etc.). In the cases of (1) and (2), a gradient elution at a concentration of from 1–10 to 400 mM is preferred and in the cases of (3) and (4), a gradient elution at a concentration of from 10–100 mM to 1 M is preferred. In a normal mode, an isocratactic elution with the acetonitrile/water ratio of from about 7/3 to 9/1 and a gradient elution while increasing the water concentration are preferred.

The packing for liquid chromatography according to the present invention can be suitably applied to separation of solutes such as proteins (e.g., monoclonal antibody and fibronectin), enzymes (e.g., ligase and protease), nucleic acids (e.g., nucleotide, oligonucleotide, DNA and RNA), glycosides (ginsenoside, steviside, rebaudioside and saponin), and so on and exhibits stale separation performance even in an acidic solution, e.g., phosphoric aid, hydrochloric acid, etc.

Upon carrying out chromatography using an open column, solutes are usually firstly in contact with the packing and a liquid mobile phase is then made to flow through the column. On the other hand, in the case using HPLC (high performance liquid chromatography) as in the following Examples, solutes are contracted with the packing simultaneously with the liquid mobile phase in the dissolved state. That is, a solution of a liquid mobile phase containing solutes is passed through the column.

The present invention is now illustrated in greater detail with reference to the following Examples and Comparative Examples, but the present invention is not to be construed as being limited thereto.

Unless otherwise indicated, all parts, percents, ratios and the like are by weight.

EXAMPLES

Example 1 (First Embodiment)

Silica beads ("Nucleosil" of Nagel; particle size 30 $\mu$m) were used as a spherical substrate. Hydroxyapatite ($Ca_{10}(PO_4)_6(OH)_2$) was used as a calcium phosphate based compound. Model "SPF210H RF" (product of Nippon Electric Anelva Co., Ltd.) was used as sputtering apparatus.

The silica beads were placed in the coating substrate holder which was equipped with a rotating mechanism to allow for the coating of the entire surface of the beads. The hydroxyapatite was set in the target vessel.

With proper settings of operating parameters such as the distance between the target and the coating substrate, high-frequency power for sputtering, and sputtering pressure, presputtering was conducted for a period of from 10 to 30 minutes as to clean the surface of the target.

Following the presputtering, RF (radio frequency) sputtering was conducted for 4 hours under the following conditions: target-to-substrate distance, 40 mm; sputtering pressure, 5.5×10 Pa; sputtering power, 100 W; and sputter rate, 40 Å/min. The resulting sample was heat-treated at 700° C. for 1 hour in an argon atmosphere. Analysis with an X-ray diffractometer and a spectrophotometer revealed that the coating on the substrate particles in the sample was made of hydroxyapatite and had a thickness of 1.2 $\mu$m.

The packing material obtained by the above procedure was composed of nearly spherical 32.4 $\mu$m in diameter, with a hydroxyapatite coating 1.2 $\mu$m thick. This packing material was packed in a wet (swollen) state into a stainless steel of column 7.5 mm in diameter and 100 mm long; using this column, standard proteins were analyzed by high-performance chromatography (chromatograph, Shimadzu LC-6A). The conditions and results of the analysis are shown below:

Mobile phase: sodium phosphate buffer solution (pH 6.8) with a linear gradient of 0.01–0.4 M over 30 min.

Flow rate: 1 ml/min.

Pressure: 20 $kg/cm^2$

Samples: BSA, lysozyme, and cytochrome C

Number of apparent theoretical plates: 15,000 (based on lysozyme peak)

Tailing: Small

Example 2 (First Embodiment)

Silica beads ("Nucleosil" of Nagel; particle size 30 μm) were used as a spherical substrate and hydroxyapatite were used as a calcium phosphate based compound.

A slurry was prepared by dispersing the hydroxyapatite in water at a concentration of 1%. The silica beads were charged into the slurry and stirred well. With continued stirring, the slurry was spray-dried with a Mobile Minor type spray drier (Ashizawa-Niro) at an outlet temperature of 90 to 110° C. to form granules comprising silica beads with a surface coating of hydroxyapatite. The granules were heat-treated at 700° C. for 1 hour in an argon atmosphere to make a packing material, which was composed of particles 32 μm in diameter, with a hydroxyapatite coating 1 μm thick. Using this packing material, standard proteins were analyzed as in Example 1. The conditions and results of the analysis are shown below:

- Mobile phase: sodium phosphate buffer solution (pH 6.8) with a linear gradient of 0.01–0.4 M over 30 min.
- Flow rate: 1 ml/min.
- Pressure: 20 kg/cm$^2$
- Samples: BSA, lysozyme, and cytochrome C
- Number of apparent theoretical plates: 14,000 (based on lysozyme peak)
- Tailing: Small

Example 3 (First Embodiment)

Silica beads ("Nucleosil" of Nagel; particle size, 30 μm) were used as a spherical substrate. Hydroxyapatite was used as a calcium phosphate compound.

A mixture of the silica beads and hydroxyapatite were charged into a rolling-tumbling agglomerator and a hydroxyapatite coating was formed on the surface of each silica bead. The coated silica beads were heat-treated at 700° C. for 1 hour in an argon atmosphere to form a packing material, which was composed of particles 35.2 μm in diameter, with a hydroxyapatite coating 2.6 μm thick. Using this packing material, standard proteins were analyzed as in Example 1. The conditions and results of the analysis are shown below:

- Mobile phase: sodium phosphate buffer solution (pH, 6.8) with a linear gradient of 0.01–0.4 M over 30 min.
- Flow rate: 1 ml/min.
- Pressure: 20 kg/cm$^2$
- Samples: BSA, lysozyme, and cytochrome C
- Number of apparent theoretical plates: 13,000 (based on lysozyme peak)
- Tailing: Small

Comparative Example 1 (First Embodiment)

A slurry of 1% hydroxyapatite dispersed in water was spray-dried with a Mobile Minor type spray drier (Ashizawa-Niro) at an outlet temperature of 90 to 110° C. to form hydroxyapatite granules. The granules were then heat-treated at 700° C. for 1 hour in an argon atmosphere to make a packing material, which was an agglomeration of granules from 2 to 20 μm in size (average size, 3.5 μm). Using this packing material, standard proteins were analyzed as in Example 1. The conditions and results of the analysis are shown below:

- Mobile phase: sodium phosphate buffer solution (pH 6.8) with a linear gradient of 0.01–0.4 M over 30 min.
- Flow rate: 1 ml/min.
- Pressure: 80 kg/cm$^2$
- Samples: BSA, lysozyme, and cytochrome C
- Number of apparent theoretical plates: 4,000 (based on lysozyme peak)
- Tailing: Large As described in the foregoing, the particles in the packing material of the present invention are formed by coating the surface of a spherical substrate with a calcium phosphate based compound, so they are very close to true spheres in shape and have a uniform size. The packing material comprising these particles can advantageously be used in liquid chromatography, producing such results as the increase in the number of theoretical stages attainable, reduced occurrence of tailing, and easy adjustment of the pressure for pumping a mobile phase and its flow rate.

Example 4 (Second Embodiment)

A hundred grams of tricalcium phosphate (Wako Pure Chemical Industries, Ltd.) were ground in a dry ball mill for 24 hours to make particles. The ball mill was then charged with 10 liters of water and 40 g of fluorine resin beads "Fulolon No. 1" (trademark for product of Nippon Junkatsuzai Ryutsu Center; average bead size, 0.02 μm) and the contents were stirred for 24 hours to obtain a uniform slurry. With continued stirring, the slurry was spray-dried with a Mobile Minor type spray drier (Ashizawa-Niro) at an outlet temperature of from 90 to 110° C. to form granules of from 2 to 20 μm in size.

The granules were then fired in an electric furnace under the following conditions: heating up to 700° C. at a rate of 5° C./h; subsequent heating from 700° C. to 1,100° C. at a rate of 100° C./h; holding at 1,100° C. for 3 hours; and cooling to room temperature at a rate of 200° C./h. The resulting porous granules had open pores with an average pore size of 0.01 μm, with crystalline tricalcium phosphate particles having an average size of 0.7 μm and a specific surface area of 3.46 m$^2$/g.

The porous granules were packed in a wet (swollen) state into a stainless steel column 7.5 mm in diameter and 100 mm long; using this column, standard proteins were analyzed by high-performance liquid chromatography (chromatograph, LC-6A of Shimadzu Seisakusho, Ltd.). The conditions and results of the analysis are shown below:

- Mobile phase: sodium phosphate buffer solution (pH, 6.8) with a linear gradient of 0.01–0.4 M over 30 min.
- Flow rate: 1 ml/min.
- Pressure: 15 kg/cm$^2$
- Samples: BSA, lysozyme, and cytochrome C
- Number of apparent theoretical plates: 12,000 (based on lysozyme peak)
- Durability: ≧500 cycles

Example 5 (Second Embodiment)

A hundred grams of tricalcium phosphate (Wako Pure Chemical Industries, Ltd.) were put into a polyethylene bag. After charging 185 g of an aqueous solution of 0.5% $H_2O_2$ into the bag, the contents were well kneaded by hand. The resulting slurry was transferred into a heat-resistant container which was placed in a drier with internal air circulation for 24 hours at 100° C. to obtain a dried foam. The foam was dissipated by hand and passed through a nylon sieve to obtain porous granules of from 10 to 20 μm in size.

Figure 2:
FIG. 2 is an electron micrograph showing the structure of the same particle, but at a higher magnification (×5,400)

The granules were then fired in an electric furnace under the following conditions: heating up to 700° C. at a rate of 5° C./h; subsequent heating from 700° C. to 1,200° C. at a rate of 100° C./h; holding at 1,200° C. for 3 hours; and cooling to room temperature at a rate of 200° C./h. The resulting porous granules had open pores with an average pore size of 3 μm, with crystalline tricalcium phosphate particles having an average size of 2 μm and a specific surface area of 0.52 m²/g. Electron micrographs of these porous granules are reproduced in FIG. 1 (×100) and FIG. 2 (×5,400).

A packing material composed of these porous granules was packed in a wet (swollen) state into a stainless steel column 7.5 mm in diameter and 100 mm long; using this column, standard proteins were analyzed by high-performance liquid chromatography (chromatograph, LC-6A of Shimadzu Seisakusho, Ltd.). The conditions and results of the analysis are shown below:

Mobile phase: sodium phosphate buffer solution (pH, 6.8) with a linear gradient of 0.01–0.4 M over 30 min.

Flow rate: 1 ml/min.

Pressure: 16 kg/cm²

Samples: BSA, lysozyme, and cytochrome C

Number of apparent theoretical plates: 11,000 (based on lysozyme peak)

Durability: ≧500 cycles

The results of Examples 4 and 5 show that the packing material prepared in accordance with the present invention has high resolution and exhibits superior pressure resistance and durability.

As described in the foregoing, the packing material of the present invention is composed of porous calcium phosphate based granules having open cells with an average pore size of from 0.01 to 20 μm, and the crystalline particles of which the granules are composed have an average size of from 0.1 to 10 μm. Because of these dimensional features, the packing material has high resolution and exhibits superior pressure resistance and durability. According to the process for producing this packing material, calcium phosphate based particles are mixed with pyrolyzable particles having an average size of from 0.02 to 30 μm, or a slurry containing calcium phosphate based particles is mixed with a foaming agent to form bubbles having an average size of from 0.02 to 30 μm. In either method, the resulting granules can be fired at from 900 to 1,400° C. wihtout forming a solidified structure, and instead, the fired granules have open pores with an average pore size of from 0.01 to 20 μm. By selecting a firing temperature within the above-specified range, the crystalline particles of which the granules are composed can be adjusted to have an average size of from 0.1 to 10 μm, which serves to impart superior pressure resistance and durability to the porous granules.

Example 6 (Third Embodiment)

Figure 3:
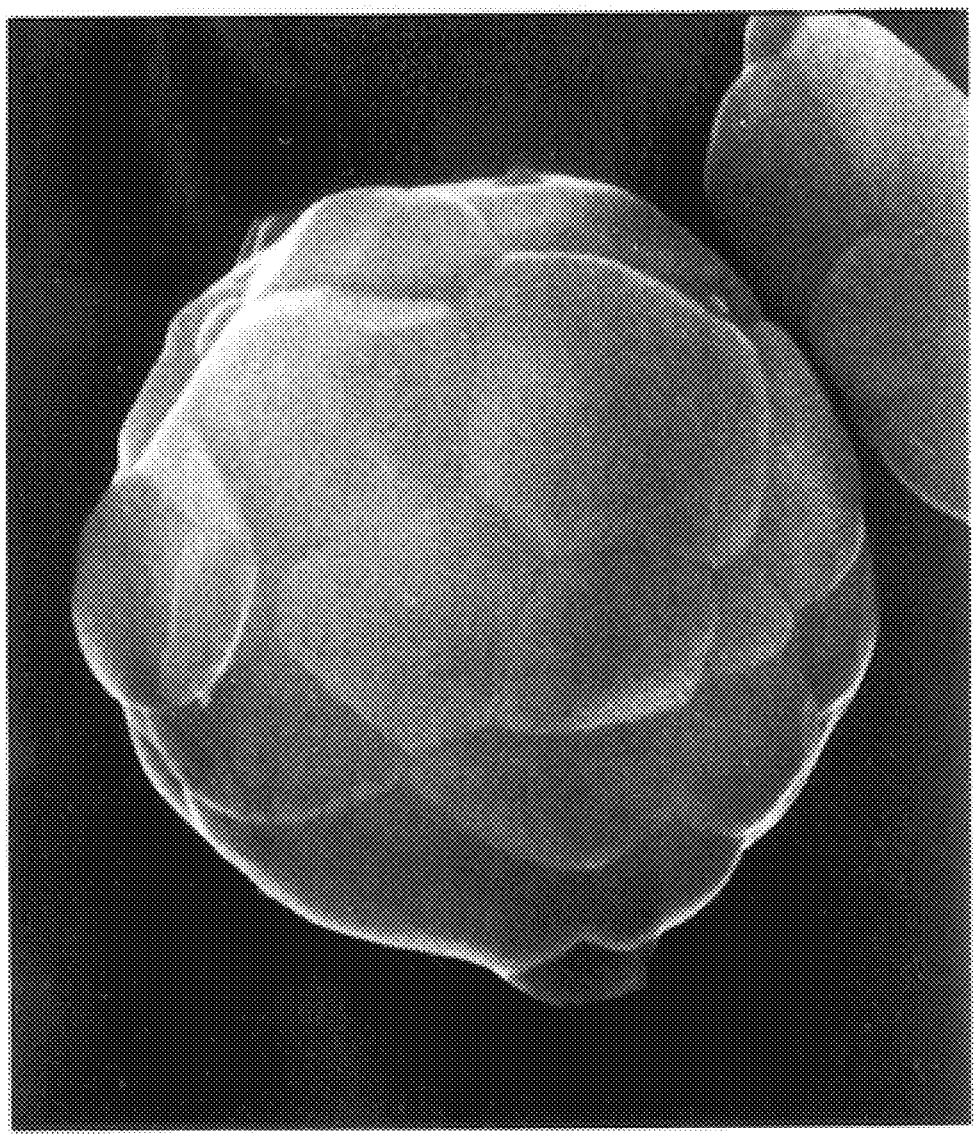
FIG. 3 is an electron micrograph (×15,000) showing the structure of a particle in the packing material prepared in Example 6.

A solution of a phosphate salt and a solution of a calcium salt were reacted by a known method to form a hydroxyapatite slurry. The slurry was granulated by spray drying with a Mobile Minor type spray drier (Ashizawa-Niro). The resulting granules, nearly spherical in shape, were fired at 1,100° C. for 4 hours to obtain a packing material of the type intended by the present invention. The particles in this packing material had an average size of 5 μm and a porosity of 1%. An electron micrograph (×15,000) of a single particle in this packing material is shown in FIG. 3.

Figure 4:
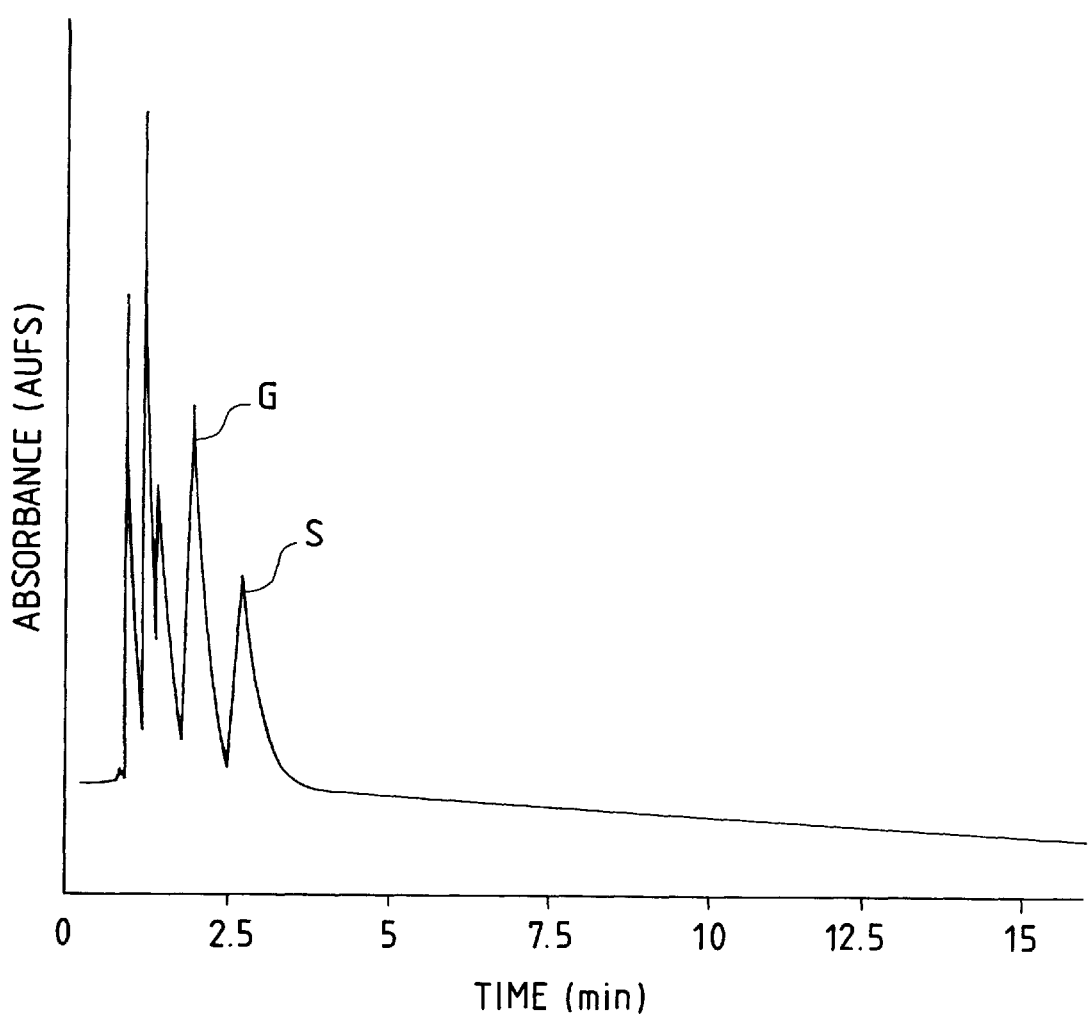
FIG. 4 is a chromatogram showing the results of separating glucose from saccharose by liquid chromatography using the packing material prepared in Example 6.

The packing material was packed into a stainless steel column (7.5 mm$^\Phi$×100 mm$^L$) for high-performance liquid chromatography, and separation between glucose and saccharose was effected on this column with an aqueous solution of 80% acetonitrile being supplied as an eluent at a flow rate of 1.5 ml/min. The chromatogram obtained is shown in FIG. 4, in which the vertical axis represents absorbance at 195 nm and the horizontal axis, time in minutes. In FIG. 4, G is a glucose peak and S a saccharose peak. As FIG. 4 shows, the packing material of the present invention is capable of separating saccharides at high resolution.

As described in the foregoing, the packing material of the present invention is generally composed of nearly spherical particles of a calcium phosphate based compound that have a dense structure with a porosity of no more than 5%. This packing material has a decreased propensity to cause separation of components in the decreasing order of their molecular weight such as occurs in the case of gel permeation chromatography, and hence is suitable for use in separation of saccharides in order of their molecular weight with the lower molecular weight components eluting first.

Example 7 and Comparative Example 2 (Fourth Embodiment)

Figure 5:
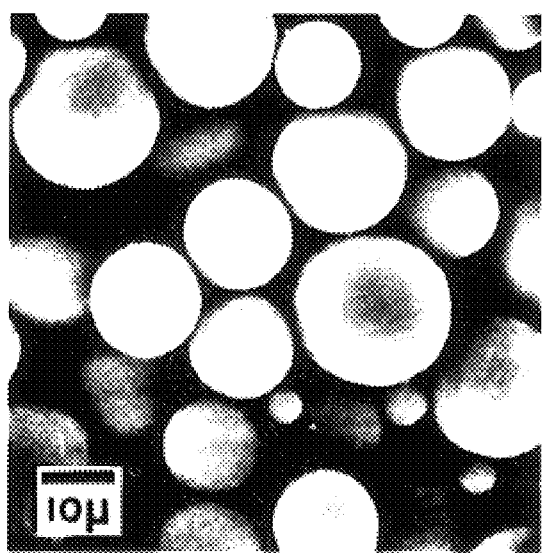
FIGS. 5 and 6 are each a scanning electron micrograph showing the particulate structure of the packing obtained in Example 7.
Figure 6:
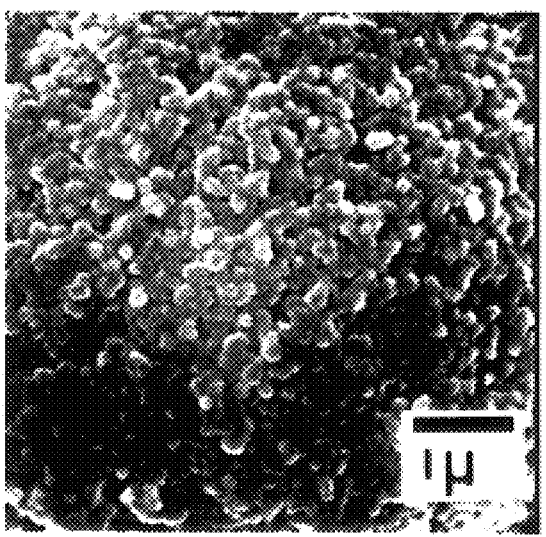

Fluoroapatite was synthesized by a conventional wet process as described in *Colloid and Surfaces,* Vol. 13, pp. 137–144 (1985). The resulting slurry was spray-dried by means of a spray drier ("Mobile Minor Model" manufactured by Ashizawaniro Co., Ltd.) to obtain packing particles having an average particle diameter of 10 μm. FIG. 5 is a scanning electron micrograph 1,000×magnification) showing the shape of the resulting packing particles. FIG. 6 is a scanning electron micrograph (10,000×magnification) showing the surface of the packing particles.

Figure 7:
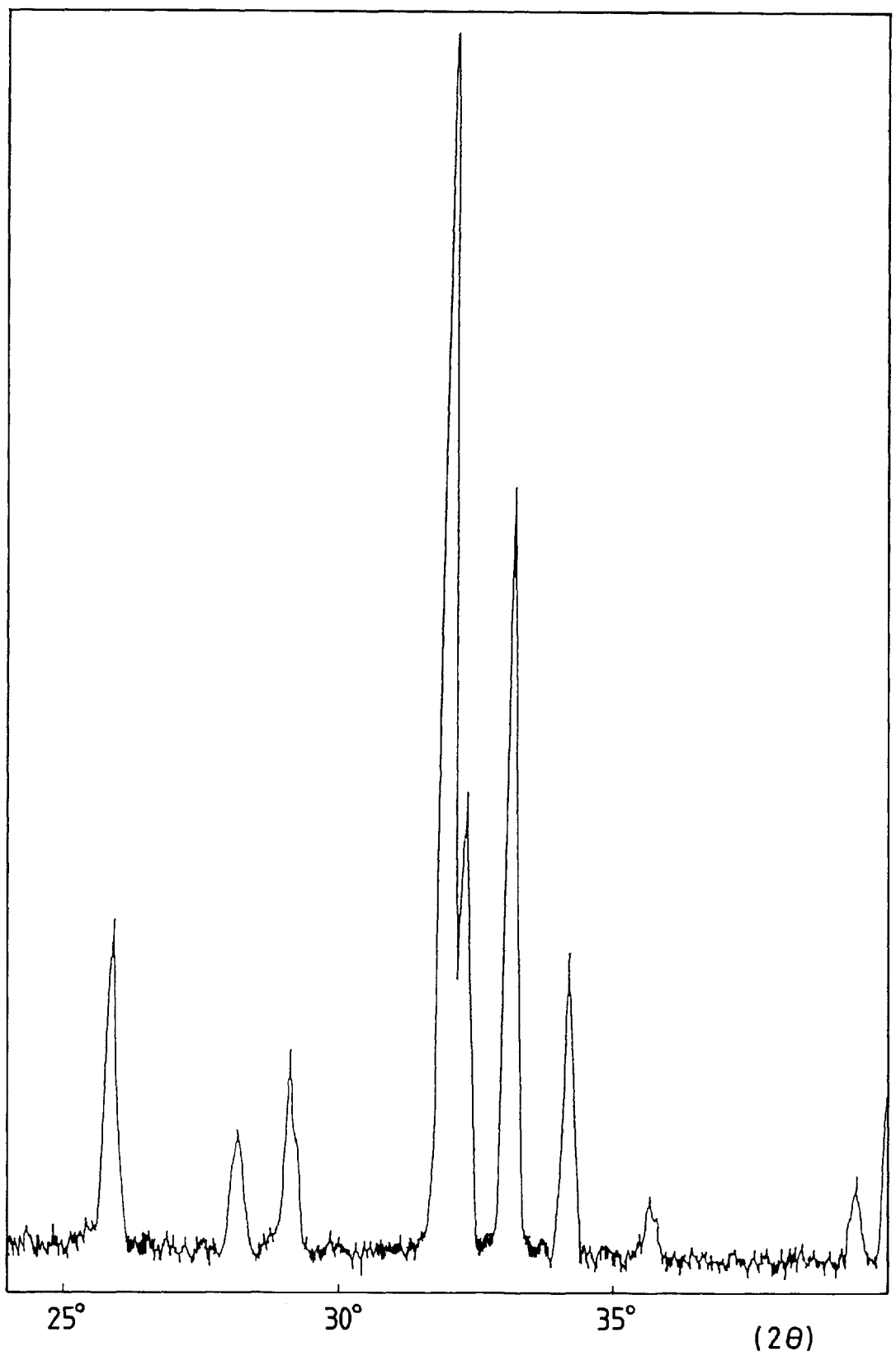
FIG. 7 is an X-ray diffraction pattern of the packing obtained in Example 7.
Figure 8A:
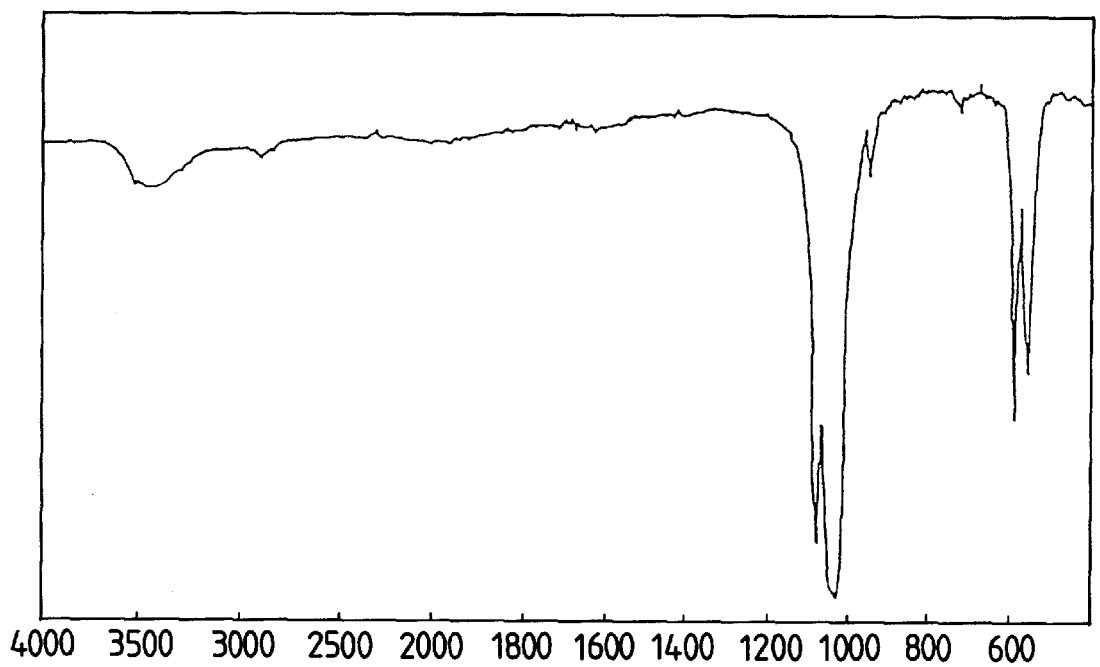
FIGS. 8(*a*) and 8(*b*) are each an infrared absorption spectrum of the packing obtained in Example 7 and a hydroxyapatite packing, respectively.
Figure 8B:
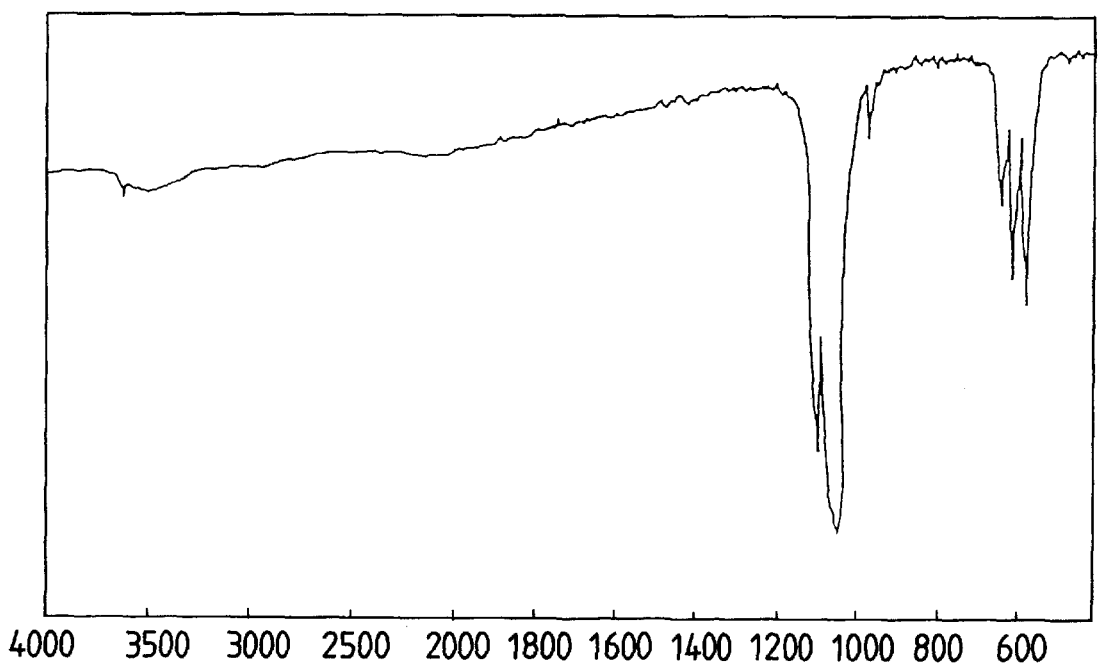

A part of the packing was calcined at 1,100° C. and subjected to X-ray diffractometry. The results obtained are shown in Table 1 below and FIG. 7. As is shown in the X-ray diffraction pattern of FIG. 7, it was confirmed that no $CaF_2$ had been formed. Further, the d value at the (300) peak was compared with the corresponding ASTM measured value as shown in Table 1 to confirm the fluorination degree. Furthermore, the packing was analyzed by infrared absorption and the results obtained are shown in FIG. 8(a). On comparison with the infrared absorption spectrum or hydroxyapatite as shown in FIG. 8(b), it was seen that the packing had no absorption due to the hydroxyl group in the vicinity of 660 cm$^{-1}$. In addition, chemical analysis of the packing revealed that the packing had a fluorine uptake of 3.8%, which means stoichiometrical formation of Fluoroapatite. From all these considerations, the produced fluoroapatite can be estimated to have a fluorination degree of 1.

TABLE 1

| | X-Ray Diffraction Pattern | | | | |
|---|---|---|---|---|---|
| | (211) | (112) | (300) | a-Axis | c-Axis |
| Found Value: | | | | | |
| Example 7 | 2.800 | 2.773 | 2.703 | 9.363 | 6.887 |
| Comparative Example 2 | 2.816 | 2.780 | 2.720 | 9.426 | 6.904 |
| ASTM Value: | | | | | |
| Fluoroapatite | 2.80 | 2.776 | 2.706 | 9.3684 | 6.8841 |
| Hydroxylapatite | 2.82 | 2.784 | 2.726 | 9.418 | 6.884 |

0.5 g of the resulting fluoroapatite particles was immersed in 100 ml of an acetic acid buffer solution at a pH of 4.0 or 5.0 for 1 or 40 hours, respectively. The supernatant liquor was then filtered through a quantitative filter paper to prepare a sample solution. The sample solution was appropriately diluted and subjected to atomic-absorption spectroscopy to determine a Ca concentration.

For comparison, hydroxyapatite packing particles (Comparative Example 2) obtained by a conventional synthesizing method followed by spray-drying in the same manner as described above were immersed in an acetic acid buffer solution to prepare a sample solution in the same manner as described above. The resulting sample solution was appropriately diluted and subjected to atomic-absorption spectroscopy to determine its Ca concentration. The results obtained are shown in Table 2 below.

TABLE 2

Acid Resistance Test
Ca Concentration (ppm)

|  | pH = 4.0, 1 Hr. | pH = 5.0, 40 Hrs. |
|---|---|---|
| Example 7 | 205 | 68 |
| Comparative Example 2 | 805 | 383 |

As is apparent from Table 2, the amount of calcium dissolved out of the fluoroapatite of Example 7 is decreased to ¼ in the case of short-term immersion and ⅕ in the case of long-term immersion as compared with that of hydroxyapatite of Comparative Example 2, indicating superiority of fluoroapatite in acid resistance.

Figure 9A:
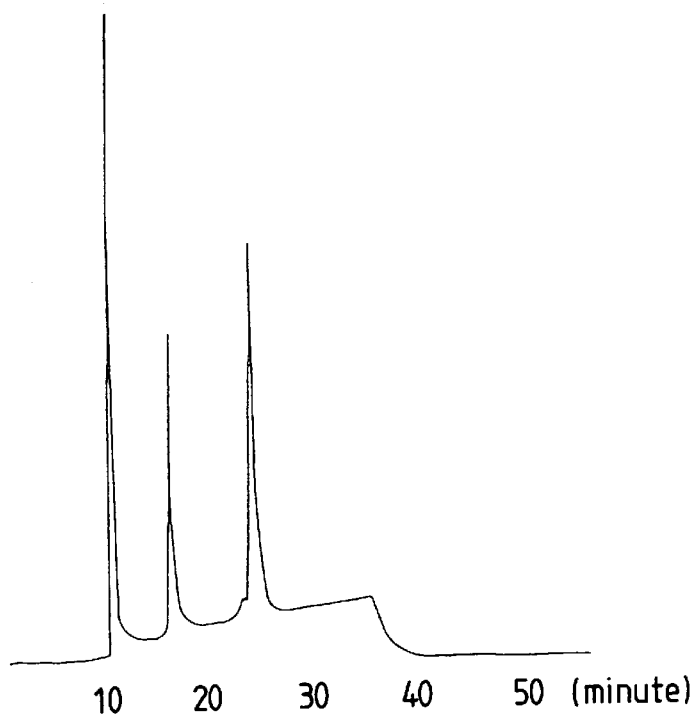
FIG. 9(*a*) is a chromatogram obtained by using the packing obtained in Example 7.
Figure 9B:
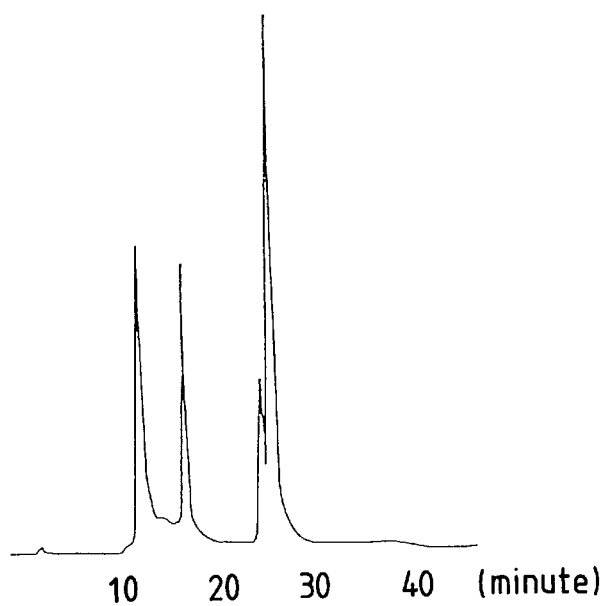

Then, each of the packings of Example 7 and Comparative Example 2 was filled by a wet process in a stainless steel column having a diameter of 7.5 mm and a height of 100 mm, and the packed column was set in a liquid chromatograph "LC-6A" manufactured by Shimazu Seisakusho Co., Ltd.). A sample solution containing a phosphoric acid buffer solution (pH=6.8) having dissolved therein 10 $\mu$g/$\mu$l of bovine serum albumin (produced by Seikagaku Kogyo Co., Ltd.), 1.25 $\mu$g/$\mu$l of lysozyme (produced by Seikagaku Kogyo Co., Ltd.; prepared from egg white by repeating crystallization 6 times), and 5 $\mu$g/$\mu$l of cytochrome C (prepared from horse heart; manufactured by Shiguma Co., Ltd.) was passed through the column at a flow rate of 1.0 ml/min to obtain a chromatogram. The results obtained are shown in FIGS. 9(a) and (b). As is apparent from FIGS. 9(a) and 9(b), the fluoroapatite of Example 7 {FIG. 9(a)} proved capable of obtaining a separation pattern similar to that of hydroxyapatite of Comparative Example 2 {FIG. 9(b)}.

Example 8 (Fourth Embodiment)

A hydroxyapatite slurry was synthesized by a conventional wet process using a calcium hydroxide slurry and a phosphoric acid aqueous solution. The resulting hydroxyapatite slurry was spray-dried by means of a spray dryer ("OC-20" made by Ohkawara Kakouki Co., Ltd.) to obtain hydroxyapatite particles. After calcined at 700° C., 50 g of the particles were suspended into 150 g of 2.7% sodium fluoride aqueous solution. The resulting slurry was filtrated, dried and calcined at 700° C. to obtain a packing material. The resulting packing material had an average diameter of about 20 $\mu$m and a porosity of about 60%.

Figure 10:
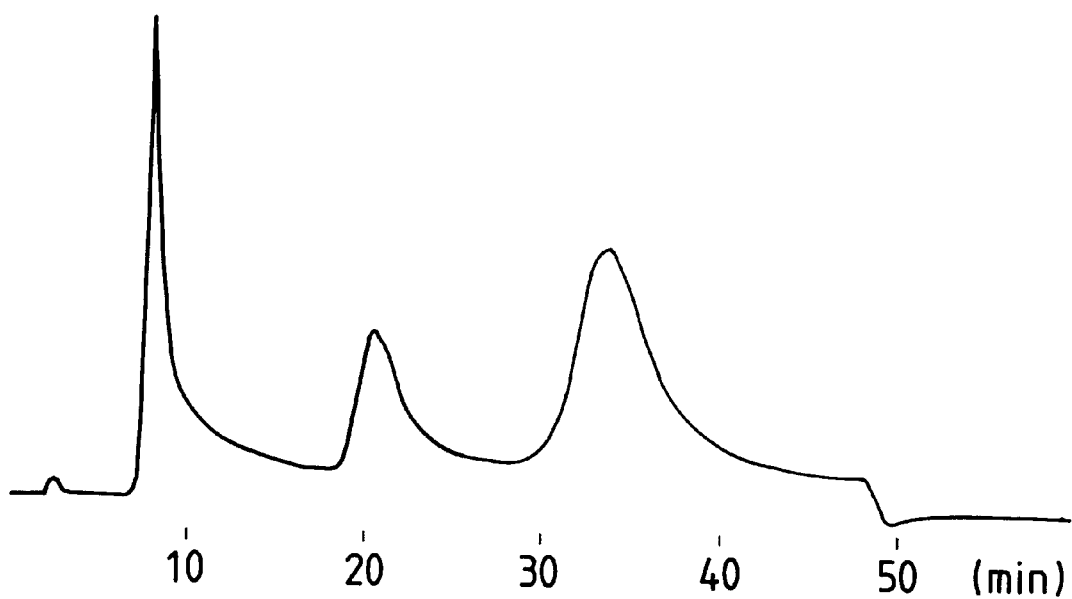
FIG. 10 is a chromatogram obtained by using the packing obtained in Example 8.

The packing material obtained above was filled by a wet process in a stainless steel column having a diameter of 7.5 mm and a height of 100 mm, and the packed column was set in a liquid chromatograph ("LC-6A" manufactured by Shimazu Seisakusho Co., Ltd.). A sample solution containing a sodium phosphate buffer (pH: 6.8) having dissolved therein bovine serum albumin, lysozyme and cytochrome C with a linear gradient of 0.01 to 0.4 M over 30 minutes and retained at 0.4 M for 15 minutes was passed through the column at a flow rate of 1 ml/min and a pressure of 8 kgf/cm$^2$ to obtain a chromatogram. The resulting chromatogram is shown in FIG. 10 attached. The number of theoretical plates for the lysozyme peak was 300.

As described above, since the packing for liquid chromatography in accordance with the present invention comprises fluoroapatite in at least its surface, it was excellent in resistance to dissolution and exhibits high and stable performance in separation of a broad range of substances. Therefore, the packing of the present invention can be used advantageously for separation and purification of proteins, enzymes, nucleic acid, and the like.

While the invention has been described in detail and with reference to specific embodiments thereof, it will be apparent to one skilled in the art that various changes and modifications can be made therein without departing from the spirit and scope thereof.

What is claimed is:
1. A packing for liquid chromatography comprising porous calcium phosphate based granules having open pores with an average pore size of from 0.01 to 20 $\mu$m, said granules being composed of crystalline particles with an average size of from 2 to 10 $\mu$m.

* * * * *